(No Model.) 2 Sheets—Sheet 2.
J. C. FARLEY.
COTTON CHOPPER.
No. 338,255. Patented Mar. 23, 1886.
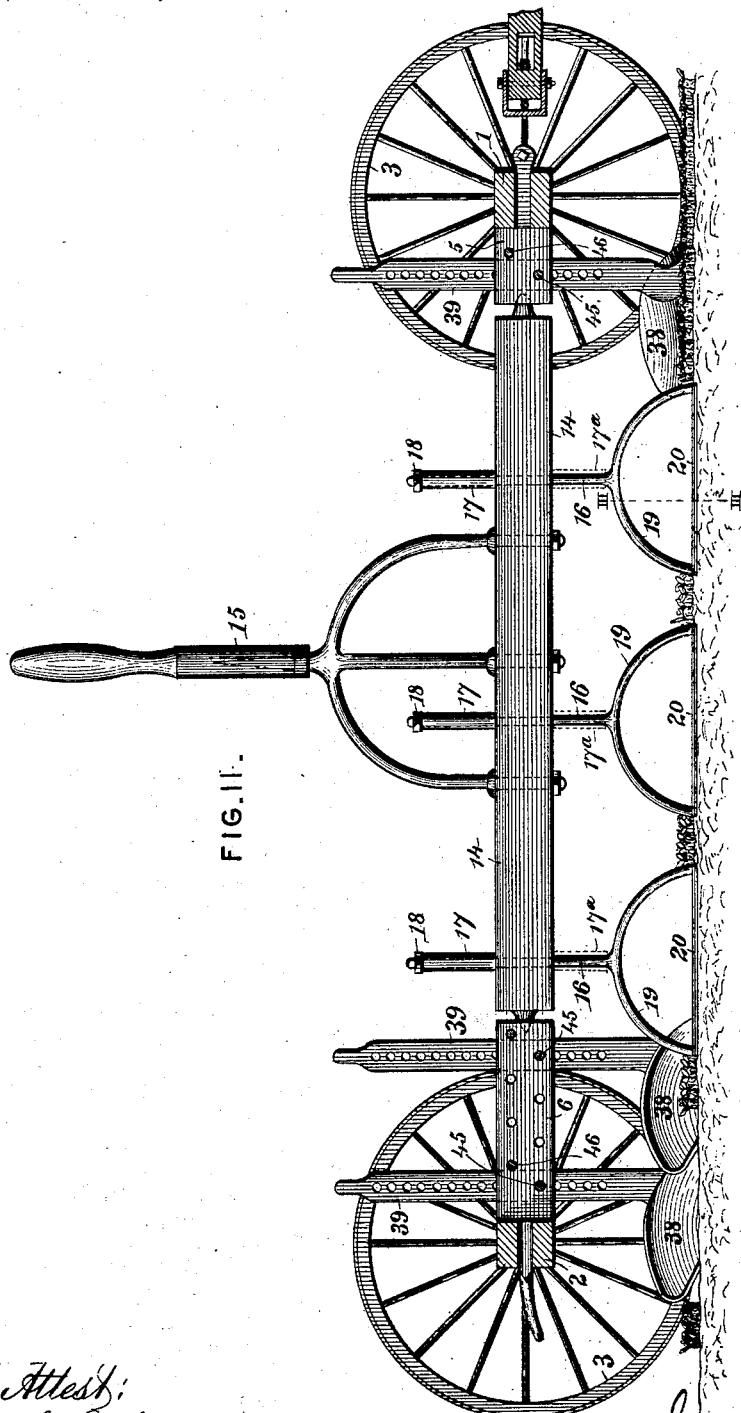
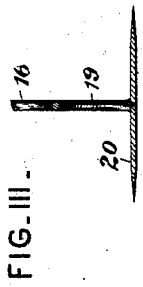

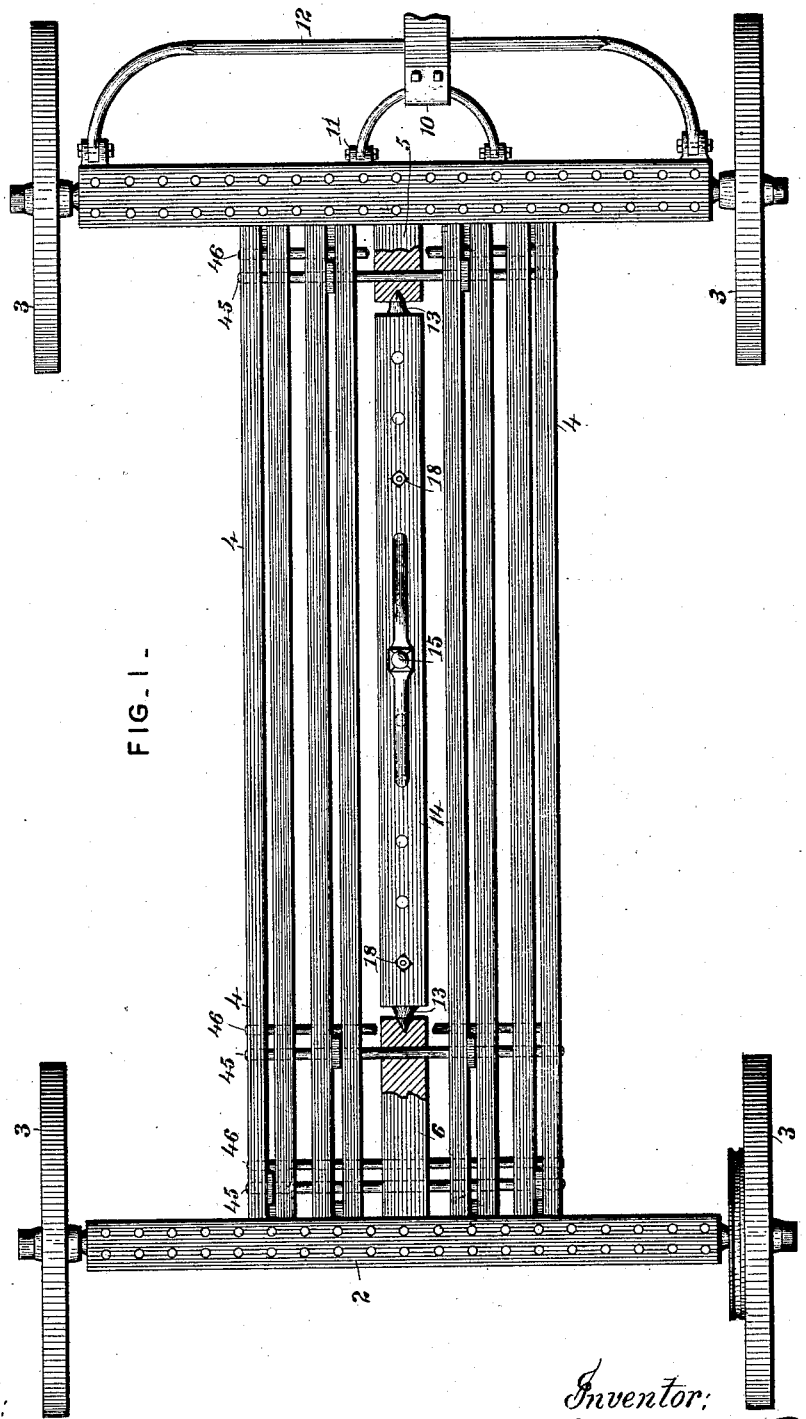

UNITED STATES PATENT OFFICE.

JOHN C. FARLEY, OF HEARNE, TEXAS.

COTTON-CHOPPER.

SPECIFICATION forming part of Letters Patent No. 338,255, dated March 23, 1886.

Application filed April 18, 1885. Serial No. 162,700. (No model.)

*To all whom it may concern:*

Be it known that I, JOHN C. FARLEY, a citizen of the United States, residing at Hearne, in the county of Robertson and State of Texas, have invented a new and Improved Cotton-Chopper, of which the following is a specification.

The subject of my invention is a machine for chopping surplus cotton or corn out of the rows or drills, leaving it in hills at the desired distance apart.

The machine consists, essentially, of a carrying-frame mounted on wheels, and a cutter-frame armed with any desirable number of knives of novel construction, to which cutting-frame a transverse oscillating movement is imparted as the machine is drawn forward over the row of cotton.

In the accompanying drawings, Figure I is a plan view of the machine. Fig. II is a side elevation thereof. Fig. III is a sectional view of one of the cutters on the line III III, Fig. II.

The front axle, 1, and rear axle, 2, are preferably made each in two parts with a horizontal space between them, as I have described and claimed in another application of even date herewith. The carrying-wheels 3, the two-part longitudinal beams 4, connecting the axles 1 and 2, the tongue 10, laterally-adjustable hounds 11, and the hinged brace-bar 12, on which the tongue slides in its lateral adjustment, may also be constructed and connected as I have described in the application above referred to. The longitudinal beams 4 are arranged in two sets with a central space between them, within which, in the horizontal plane of the beams 4, are mounted short bearing-beams 5 6, securely fastened by transverse bolts 45 46, and receiving the gudgeons 13, of an oscillating beam, 14, operated by a vertical handle, 15, and carrying pendent cutters. The shafts 16 of these cutters are secured adjustably within the oscillating beam 14 by sleeves 17 17ᵃ and nuts 18, and are formed at their lower ends in two branches, 19, for the attachment of horizontal double-edged cutting-blades 20, which are made of flat plates if they are intended to simply chop the cotton and drop the severed stalks where they are cut, or may be formed with a central ridge if it is desired to throw the stalks and a light body of earth to one side at each stroke. The beams 4 also carry any desirable number of ridging or cultivating plows, 38, the standards 39 of which are fastened adjustably within said beams by the horizontal bolts 45, and stayed by bolts 46, as I have described in the application hereinbefore referred to. The cutters 16 19 20 being set at the required distance asunder, the operator riding on the machine grasps the handle 15, and as the machine progresses the handle is held deflected to one side until the space for a hill is passed, when he imparts a rapid lateral movement to the oscillating frame, chopping out three spaces between as many hills of cotton, and retaining the handle in its new position, in readiness for repeating the stroke in the opposite direction. Three hills are thus chopped out at each stroke of the oscillating frame in either direction.

Having thus described my invention, the following is what I claim as new therein, and desire to secure by Letters Patent—

1. In a cotton-chopper, in combination with axles 1 2, longitudinal beams 4, connecting said axles, short bearing-beams 5 6, fixed to the axles, oscillating beam 14, supported between said beams 5 6, handle 15, fixed to and projecting upwardly from said beam 14, and choppers depending from said beam 14, substantially as and for the purpose set forth.

2. In combination with an oscillating beam, 14, supported from the axles of a cotton-chopper, and having operating-handle 15, a series of choppers depending from said beam 14, substantially as and for the purpose set forth.

3. In a cotton-chopper, in combination with the oscillating beam, the shafts 16, supported in said beams, having bifurcated arms 19 at bottom, and cutter-blades 20 between said arms, substantially as set forth.

4. In combination with oscillating beam 14, the shafts 16, sleeves 17 17ᵃ, surrounding the same, and nuts 18, arranged substantially as and for the purpose set forth.

J. C. FARLEY.

Witnesses:
OCTAVIUS KNIGHT,
HARRY E. KNIGHT.